(No Model.)

H. M. DU BOIS.
TIRE FOR VEHICLE WHEELS.

No. 397,459. Patented Feb. 5, 1889.

Witnesses
L. Douville
Wm. J. Moore

Inventor
Howard M. DuBois
By his Attorneys
Diederheim & Kintner

UNITED STATES PATENT OFFICE.

HOWARD M. DU BOIS, OF PHILADELPHIA, PENNSYLVANIA.

TIRE FOR VEHICLE-WHEELS.

SPECIFICATION forming part of Letters Patent No. 397,459, dated February 5, 1889.

Application filed November 1, 1888. Serial No. 289,750. (No model.)

*To all whom it may concern:*

Be it known that I, HOWARD M. DU BOIS, a citizen of the United States, residing in the city and county of Philadelphia, State of Pennsylvania, have invented a new and useful Improvement in Tires for Vehicle-Wheels, which improvement is fully set forth in the following specification and accompanying drawings.

My invention relates to improvements in tires of vehicle-wheels formed of metal with elastic treads; and it consists of novel means for securing said treads to the tires, as will be hereinafter fully set forth.

Figure 1:
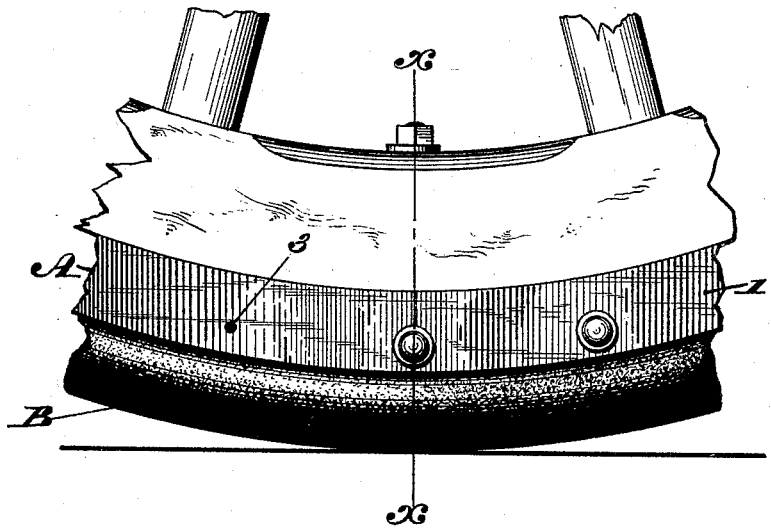
Figure 2:
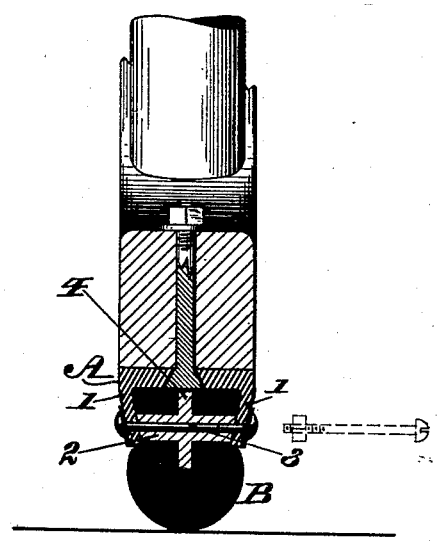
Figure 3:

Figure 1 represents a side elevation of a portion of a tire for a vehicle-wheel embodying my invention. Fig. 2 represents a section thereof on line $x$ $x$, Fig. 1. Fig. 3 represents a perspective view of a detached portion thereof.

Similar letters and numerals of reference denote corresponding parts in the several figures.

Referring to the drawings, A represents a tire, and B the tread thereof, said tire being adapted to be secured to a wheel in well-known manner, and is formed of wrought-iron or steel with side flanges, 1, producing a circumferential channel into which the inner portion of the tread is received, said tread being formed of soft rubber or other elastic material. Within the inner portion of the tread are tubular plugs 2, of hard rubber, or rubber and canvas, or other material, the same being embedded and vulcanized in the tread and extending transversely, so that their open ends are contiguous to the inner faces of the flanges 1. Pins or rivets 3 are passed through the plugs and flanges and headed on the latter, whereby the tread is firmly connected with the tires and the flanges of the latter are clamped to the inner portion of the tread, it being evident that the plugs retain their positions in the treads and are not liable to be torn out of the same.

If desired, screws or bolts and nuts may be employed in lieu of the pins or rivets 3, as shown in dotted lines.

In order to increase the holding action of the plugs, the same have formed or connected with their peripheries flanges or heads 4, which are also embedded in the tread and serve to brace the tread and strengthen the connection of the plugs with the tread, especially in the lateral or transverse direction of the plugs.

Having thus described my invention, what I claim as new, and desire to secure by Letters Patent, is—

1. A metallic tire with side flanges having an elastic tread within the same, a transverse tubular plug passing through said tread and having its ends contiguous to said flanges, and a pin passing through both the plug and side flanges and secured to the latter, said parts being combined substantially as described.

2. An elastic tread having a tubular plug contained therein, in combination with a pin passing through said plug and secured to the sides of the tire, substantially as described.

3. A tread for a tire having therein a plug with a head on the periphery thereof, said plug being adapted to be secured to the said flanges of the tire, substantially as described.

4. A metallic tire having flanges forming a circumferential channel or groove, an elastic tread within said channel, a tubular plug having a peripheral head within said tread and having its ends contiguous to the flanges of the tire, and a pin passing through said tube and flanges, said parts being combined substantially as and for the purpose set forth.

HOWARD M. DU BOIS.

Witnesses:
 JOHN A. WIEDERSHEIM,
 A. P. JENNINGS.